No. 773,604.

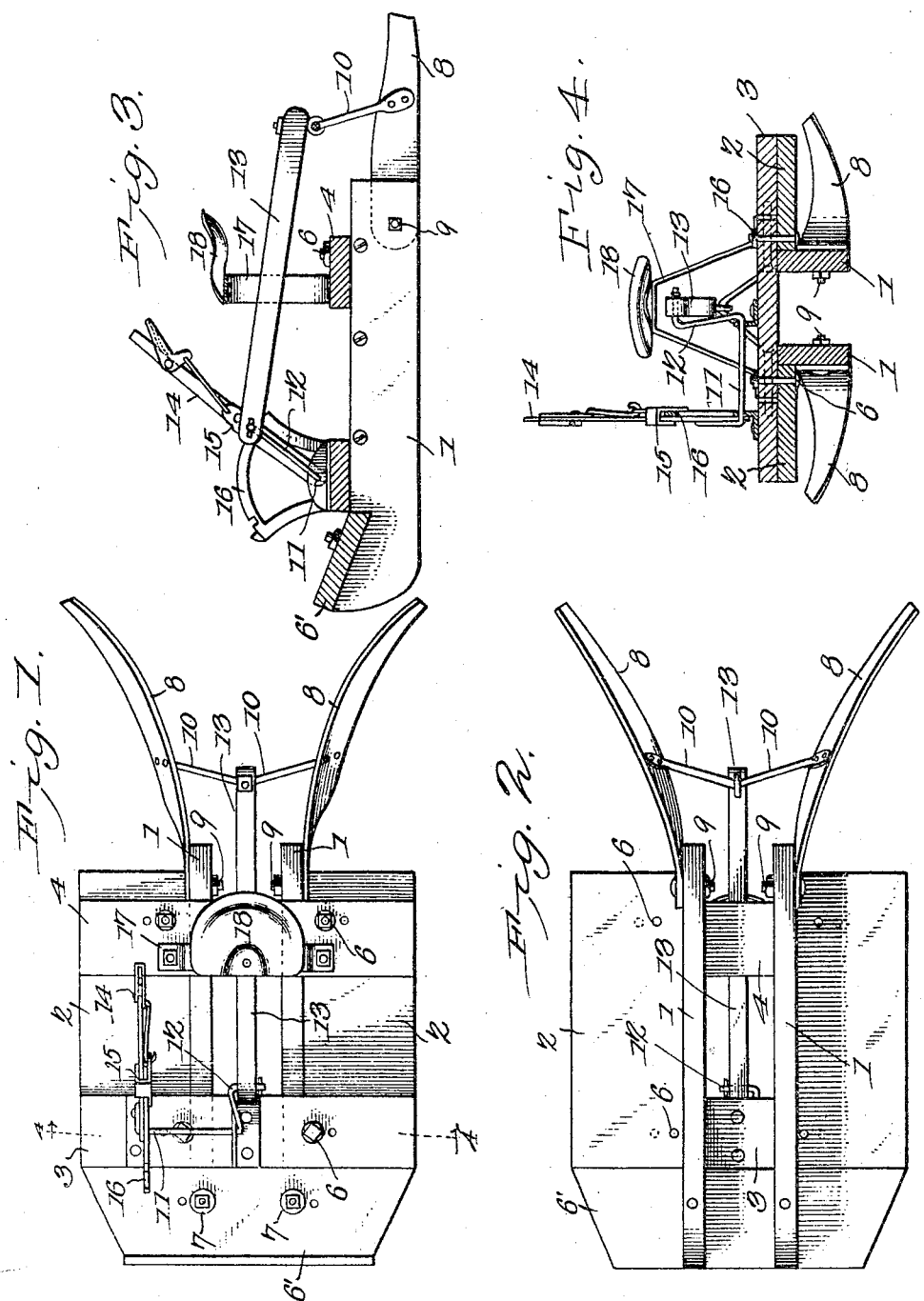

Patented November 1, 1904.

UNITED STATES PATENT OFFICE.

HENRY STRIPE, OF MILAN, KANSAS.

CORN-CULTIVATOR.

SPECIFICATION forming part of Letters Patent No. 773,604, dated November 1, 1904.

Application filed March 21, 1904. Serial No. 199,199. (No model.)

*To all whom it may concern:*

Be it known that I, HENRY STRIPE, a citizen of the United States, residing at Milan, in the county of Sumner and State of Kansas, have invented a new and useful Corn-Cultivator, of which the following is a specification.

This invention relates to that class of corn-cultivators which are intended especially for the purpose of cultivating listed corn; and it has for its object to provide a device of this class which shall be simple in construction, conveniently and easily operated, and inexpensive, and which may be set or adjusted to operate successfully upon rows of plants spaced different distances apart.

With these and other ends in view the invention consists in the improved construction, arrangement, and combination of parts which will be hereinafter fully described, and particularly pointed out in the claim.

In the accompanying drawings has been illustrated a simple and preferred form of embodiment of the invention, it being understood that the construction may be changed and modified as to the details thereof within the scope of the invention when this may be done without departing from the spirit or sacrificing any of the advantages of the device.

In said drawings, Figure 1 is a top plan view of a corn-cultivator constructed in accordance with the principles of the invention. Fig. 2 is a bottom plan view of the same. Fig. 3 is a longitudinal sectional view. Fig. 4 is a transverse sectional view taken on the line 4 4 in Fig. 1.

Corresponding parts in the several figures are indicated by similar numerals of reference.

The improved corn-cultivator of my invention is supported upon a pair of runners 1 1, having laterally-extending flanges 2 2 at the upper edges thereof, said flanges being extended outwardly from the upper edges of the runners. The latter are spaced apart by means of cross-pieces 3 and 4, with which the said runners and flanges are connected adjustably by means of bolts 6, said cross-pieces being each provided with a plurality of perforations for the passage of the bolts in order that the runners may be spaced apart any desired distance within such limits as may be desired. The upper sides of the front ends of the runners are deflected upwardly and forwardly to support a downwardly and rearwardly inclined deflecting-board 6', which is likewise connected adjustably with the runners by means of bolts 7, for the reception of which the deflecting-board 6' is provided with a plurality of perforations suitably spaced apart. This deflecting-board serves to engage weeds and similar obstructions which will be thereby bent downwardly to a position in which they may be successfully acted upon by the cultivating implements of the device. Pivotally connected with the rear ends of the runners are the cutters 8 8, which consist of blades which are pivoted to the outer sides of the runners by means of pins or bolts 9. At their points of connection with the runners these blades are practically vertical. From their points of connection with the runners the blades diverge rearwardly and are twisted to form moldboards, whereby the material engaged by the blades will be gradually upturned and thrown back in the direction of the ridge from which it is cut, the object being to not merely cut the weeds and obnoxious growths closely adjacent to the young corn, but also to overturn such weeds, &c., so as to expose the roots thereof to the destructive agency of the sun, while the fine soil will be permitted to fall back upon the ridge, thereby promoting and stimulating the growth of the corn.

The blades or cutters 8 8 are connected by means of a yoke 10.

The front cross-piece 3 supports bearings for a rock-shaft 11, having at its inner end a crank 12, which is connected by a rod 13 with the yoke 10. The outer end of the rock-shaft 11 carries an adjusting-lever 14, having a spring-actuated pawl or dog 15 engaging a rack-segment 16, which constitutes one of the bearings for the rock-shaft. The latter may thus be retained in any position to which it may be adjusted, thereby enabling the blades or cutters 8 to be raised or lowered as may be required and to be retained securely in any position to which they may be adjusted. The rear cross-piece 4 supports a seat-supporting yoke 17, between the arms of which the connecting-rod 13 extends. The driver occupying the seat 18 may conveniently manipulate the lever 14 to adjust the blades. It is obvious that the weight of the driver assists in keeping the implement to its work.

The operation of the invention will be readily understood from the foregoing description, taken in connection with the accompanying drawings. The runners 1 1 will straddle the row of plants, and the cutters will remove noxious growth of weeds and the like closely adjacent to the young corn and will not merely overturn the same to expose the roots to the sun, but also throw the fine dirt in the direction of the crop. The runners may be readily adjusted at any desired distance apart. The flanges 2 of the runners will bear upon ridges adjacent to the one which is being operated upon by the cutters and will thus assist in guiding the implement. By adjusting the runners laterally with relation to the cross-pieces it is obvious that the implement may be adjusted to operate upon rows planted at different distances apart. The deflector 6, at the front end of the device, will bend such of the young plants as may be in an advanced stage of growth and cause them without injury to pass between the runners of the implement, while the flanges which project laterally from the upper edges of the runners will serve to beat down weeds and similar obstructions and to hold them in a position favorable to be successfully operated upon by the earth-engaging blades of the device.

As will be seen, my improved corn-cultivating implement is extremely simple in construction and capable of being made at a trifling expense. Its operation is simple and very beneficial to the crops.

Having thus described my invention, I claim—

In a cultivating implement for listed corn, a frame structure including a pair of runners provided at the upper edges thereof with laterally-extended flanges, cross-pieces extending across said runners and flanges near the front and rear ends of the same, bolts extending through said cross-pieces and flanges and connecting the same adjustably, and an inclined deflecting-board at the front end of the frame; in combination with earth-engaging blades connected pivotally with the runners near the rear ends of the latter, a yoke connecting said blades, a rock-shaft upon the front cross-piece having a crank, a rod connecting said crank with the yoke connecting the blades, and means for adjusting the rock-shaft and for retaining it in adjusted position.

In testimony that I claim the foregoing as my own I have hereto affixed my signature in the presence of two witnesses.

HENRY STRIPE.

Witnesses:
   W. T. DERINGTON,
   J. T. SAPPENFIELD.